(12) United States Patent
So

(10) Patent No.: US 6,872,917 B2
(45) Date of Patent: Mar. 29, 2005

(54) AUTOMATIC COOKER

(76) Inventor: Fuk Sang So, Room 1305A, Kai Tak Commercial Building, 317-319 des Vouex Road, Central, Sheung Wan (HK)

( * ) Notice: Subject to any disclaimer, the term of this patent is extended or adjusted under 35 U.S.C. 154(b) by 43 days.

(21) Appl. No.: 10/294,141

(22) Filed: Nov. 12, 2002

(65) Prior Publication Data

US 2003/0106886 A1 Jun. 12, 2003

(51) Int. Cl.⁷ .............................. A47J 1/42; A47J 1/44; F27B 7/12; F27B 7/26; F27B 7/36
(52) U.S. Cl. ..................................... 219/389; 99/443 R
(58) Field of Search ........................ 219/389; 99/443 R

(56) References Cited

U.S. PATENT DOCUMENTS

| | | | | |
|---|---|---|---|---|
| 1,880,822 A | * | 10/1932 | Cook et al. ................. | 219/389 |
| 2,354,100 A | * | 7/1944 | Spencer ..................... | 219/389 |
| 2,722,172 A | * | 11/1955 | Garbo ........................ | 219/389 |
| 4,048,473 A | * | 9/1977 | Burkhart .................... | 219/389 |
| 4,450,758 A | * | 5/1984 | Belinkoff et al. ............. | 99/332 |
| 5,134,927 A | * | 8/1992 | McCarthy et al. .......... | 219/389 |
| 5,182,981 A | * | 2/1993 | Wilcox ....................... | 219/389 |

* cited by examiner

Primary Examiner—Joseph Pelham
(74) Attorney, Agent, or Firm—Ostrolenk, Faber, Gerb & Soffen, LLP

(57) ABSTRACT

The invention relates to a cooking utensil, and more particularly, to an electric automatic cooker. The automatic cooker includes semi-spherical cooking body which is driven with a power motor to rotate in both longitudinal direction and latitudinal direction. The automatic cooker further includes a stirring rib and a cooking body and heater for the electric oven which are arranged in the housing. According to the invention configured with automatic control devices, the operator can be away from the oven-range so that automatic cooking operation is realized. The invention can further includes a ventilator motor which can allow the gas and fume to be filtered out by multiple times so that it improves both inside and outside enviroment of the kitchen room, thereby protecting the operator from contamination.

19 Claims, 3 Drawing Sheets

AUTOMATIC COOKER

BACKGROUND OF THE INVENTION

1. Field of the Invention

The present invention relates to a cooking utensil, and more particularly, to an electric automatic cooker.

2. Description of Related Art

In a traditional cooking process, an operator has to use his both hands to perform the cooking operation. That is, the operator uses one hand to hold pancake turner while the other one to hold the cooking body. Further more, in order to heat the food to an appropriate temperature evenly, the hand holding the pancake turner have to stir the food in the cooking body continuously. In addition, the operator could not go away from the oven-range as well as the heat generated from the cooking process makes the kitchen room overheated and polluted, thus making the environment of the kitchen undesirable. The traditional cooking process is very complicated as well as laborious.

In general, the gas and fume generated from the cooking process are discharged outside through a kitchen ventilator, therefore they contaminate both inside and outside of the kitchen room.

SUMMARY OF THE INVENTION

The present invention is made to overcome the problems of the cooking process mentioned above. Accordingly, it is an object of the present invention to provide an automatic cooker which is configured to allow the food in the pan to be heated evenly. Also it can greatly reduce the fatigue of the operator while remarkably improve the enviroment of the kitchen room.

The foregoing and other objects of the present invention are achieved by providing an automatic cooker comprising a hollow semi-spherical cooking body which is driven with a power motor.

In an arrangement of the automatic cooker, the power motor can be attached to the positioning hole on the cooking body through the positioning column provided on the power motor to make the cooking body rotate in latitudinal direction.

In an arrangement of the automatic cooker, the cooking body can rotate along longitudinal direction either in single direction or in bi-direction and rotate either in clockwise direction or in counterclockwise direction.

In an arrangement of the automatic cooker, the cooking body can rotate along latitudinal direction with either more than 360° or less than 360° and rotate either in a successive state or in an intermittent state.

In an arrangement of the automatic cooker, the rotation angle along longitudinal direction defined by the vertical central line and the horizontal plane is configured to be limited between 0 degree to 90 degree.

In an arrangement of the automatic cooker, said cooking body is provided with a stirring rib.

In an arrangement of the automatic cooker, the cooking body and the heater for the electric oven are arranged inside the housing.

In an arrangement of the invention, the automatic cooker further includes a ventilating fan driven by a power motor wherein the blade assembly of the ventilating fan is composed of at least two sets of blades and the side of the lower portion of the blade assembly is provided with air outflow ports.

In an arrangement of the automatic cooker, the ventilator introduces the fume within the housing into the water through the blade assembly of the ventilator fan after increasing the pressure of the fume, thereby filtering the fume out by the water. Then, the filtered gas and fume introduce into the housing are guided into the water again, thus an operation cycle is achieved.

In an arrangement of the automatic cooker, the pump below the ventilator pumps the water into the suction conduit and the water is introduced into the secondary filtering conduit, whereby the water mixes with the fume and gas; then, the water is introduced into the water tank through the water discharging port provided on the side of the secondary filtering conduit so that the water can be utilized repeatedly and the multiple filtering process is realized.

In the automatic cooker according to the present invention, the cooking body is attached to the column and when the cooking body is driven with the power supply unit, the cooking body rotates in latitudinal direction so that the food to cook in the cooking body will be stirred up continuously. Particularly, the stirring rib provided in the cooking body enhances the stirring effect of the food (both solid food and liquid food). With this configuration, the present invention provides an automatic cooker which may partly or wholly replace the manual operation of stirring the food being cooked. Provided with timing device, signal device and alarming device in the power supply unit, the automatic cooker can heat the food being cooked evenly and prevent it from overheated in case that the operator is away from the range-oven. In addition, various cooking operation such as frying, stir-frying, steaming, braising and stewing can be performed by adjustment the rotation angle of the cooking body in response to the rotation of the handle.

Since the cooking body and the electric oven are arranged in the housing, the heat generated in the cooking process is concentrated in the housing. The heated air and fume are sucked into the water tank where the air and fume are mixed with water accumulated therewith by the operation of the ventilator. Then, the air and fume are introduced into the housing through air discharging conduit while outside air is sucked into housing through the bottom of the housing. As a result, the high temperature of air and fume drops down and the oil or grease contained in fume is retained in the water. Therefore, the present invention provides a automatic cooker which can improve the environment of both inside and outside of the kitchen room. Moreover, an automatic cooking can be achieved with the operator being away from the range-oven after he sets the function-controlling device of timing, informing and alarming.

DETAILED DESCRIPTION OF THE PREFERRED EMBODIMENTS

Hereinafter, the preferred embodiments will be described in detail with reference to the accompanying drawings.

Figure 1:
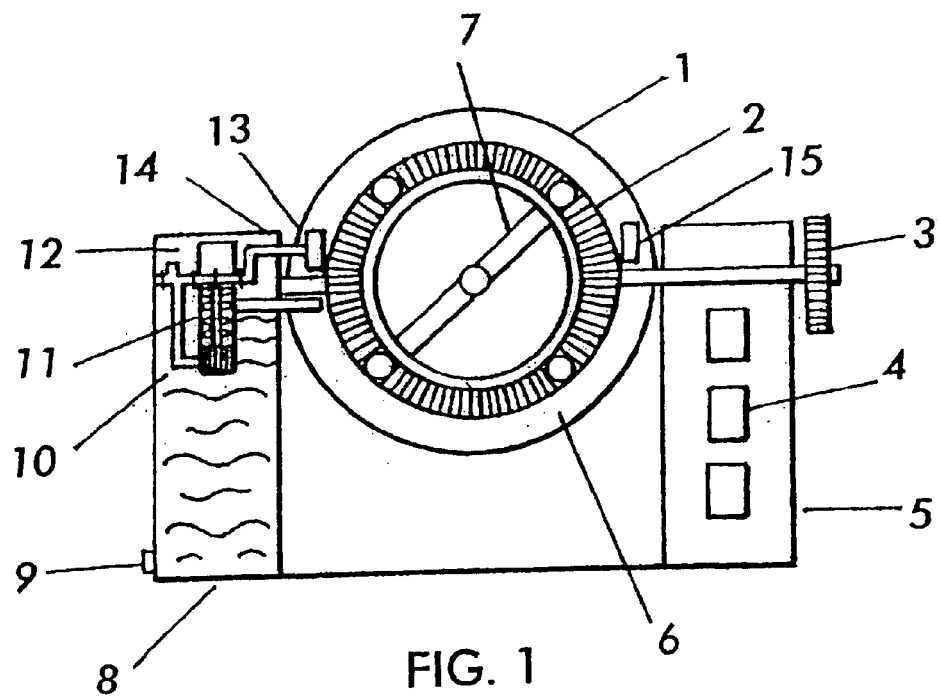
FIG. 1 is a front view of the automatic cooker according to an embodiment of the invention.
Figure 2:
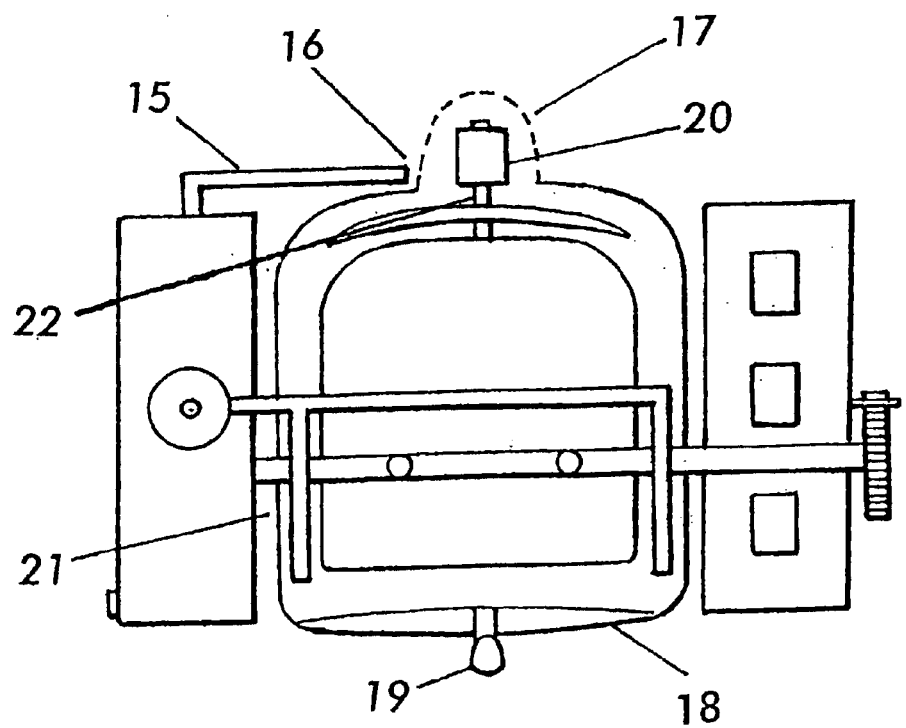
FIG. 2 is a top view of the automatic cooker according to an embodiment of the invention.
Figure 3:
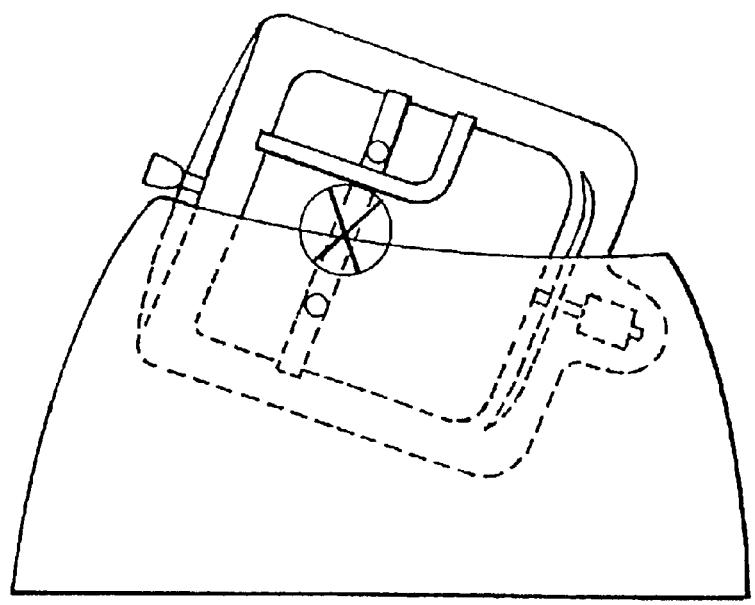
FIG. 3 is a side view of the automatic cooker in an inclining state according to an embodiment of the invention.
Figure 4:
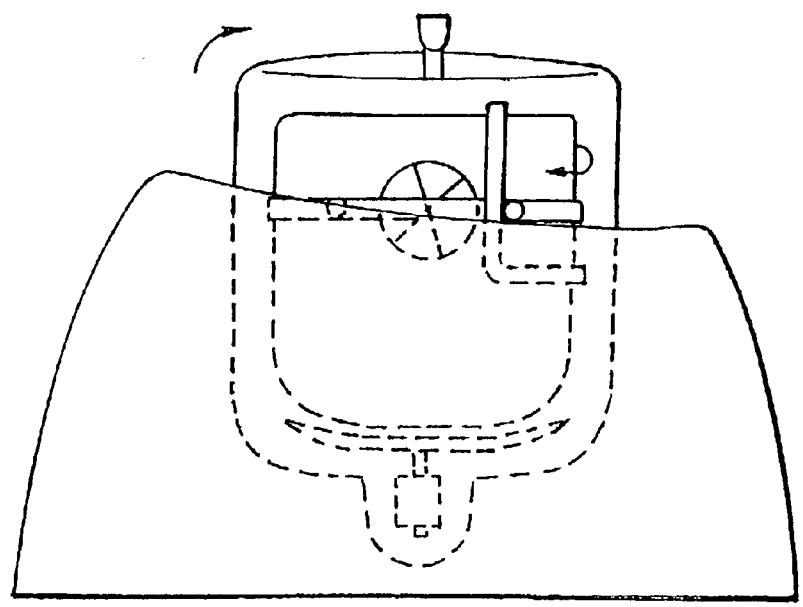
FIG. 4 is a side view of the automatic cooker in a vertical state according to an embodiment of the invention.

As shown in FIGS. 1 and 2, the automatic cooker is composed of a power motor 20 and a cooking body 2. A stirring rib 7 is provided inside the cooking body 2. A hollow semi-spherical food container (cooking body) 2 is inserted in the annular ring of the bearing structure (bearing ring 6). When the positioning hole (not shown) in the bottom of the cooking body 2 is attached to the positioning column 22 of the motor 20, the cooking body 2 can rotate in latitude direction (ditto, as shown in FIG. 4, wherein the cooking body is in vertical state) due to the rotation of the motor 20. It should be noted that this invention is not limited in this regard, as the cooking body 2 can rotate either in one single direction or bi-direction and either in successive state or in intermittent state. Furthermore, it can rotate along the longitudinal direction or latitudinal direction and either more than 360° or less than 360°. Two longitudinal shafts 21 are provided on the outer ring 6 of the bearing structure which rotates together with the housing 1 and motor 20 in synchronous state along longitudinal direction (shown in FIGS. 3 and 4). The roller 3 is adapted to control the rotation and the rotation angle of the cooking body. In this case, the rotation angle defined by the vertical central line and the horizontal plane is limited between 0 degree and 90 degrees. The housing 1 has a cover 18 with a handle 19.

Figure 5:
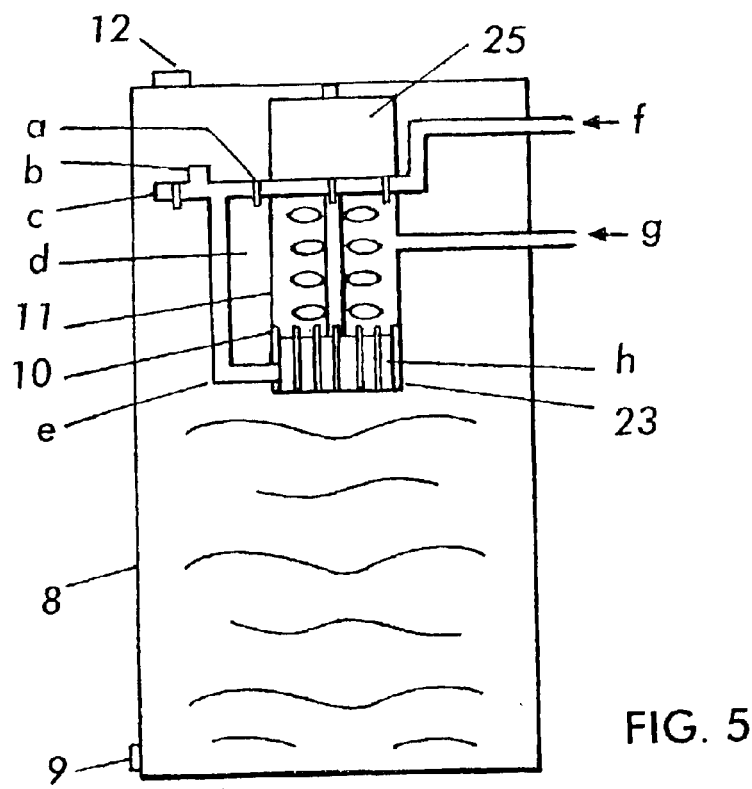
FIG. 5 is a graph showing the secondary filtering process of the kitchen ventilator in the automatic cooker according to an embodiment of the invention.

The automatic cooker further includes a ventilator motor 12 which is connected to the blade assembly 11 of the ventilating fan. Air inlet is at 16, 17. The air there mixes with fumes. There is an outlet for gas and fumes at 13 and 15 through which the gas and fumes are conveyed by the ventilation for 11. In order to increase the pressure of it, the gas is introduced into water where the gas and fume are filtered out. The blade assembly 11 comprises at least two sets of blades. Air outflow ports 10 are provided on the side of the lower portion of the blade assembly 11 so that the gas sucked by the blade assembly 11 is introduced into water through air outflow ports 10. A pump 23 (as shown in FIG. 5) is mounted under air outflow ports 10. The pump 23 driven by ventilator motor 12 rotates in synchronized operation together with the blade assembly 11, thus water is sucked into the secondary filtering conduit (as shown in FIG. 5). After mixing with the fume and gas again in the secondary filtering conduit, the water returns to water tank 8 through water discharging ports c formed in the side of the secondary filtering conduit. With these configurations, the gas containing fume mixes with water and recycles continuously, thereby filtering out the fume and cooling the housing 1. In addition, the water containing fume in the water tank 8 is discharged outside from the water discharging port 9 and refilled periodically.

The automatic cooker according to the present invention also includes an electric oven 22 (as shown in FIG. 2) which is turned on/off in synchronized operation with the power supply unit of the ventilator motor 12.

Figure 6:
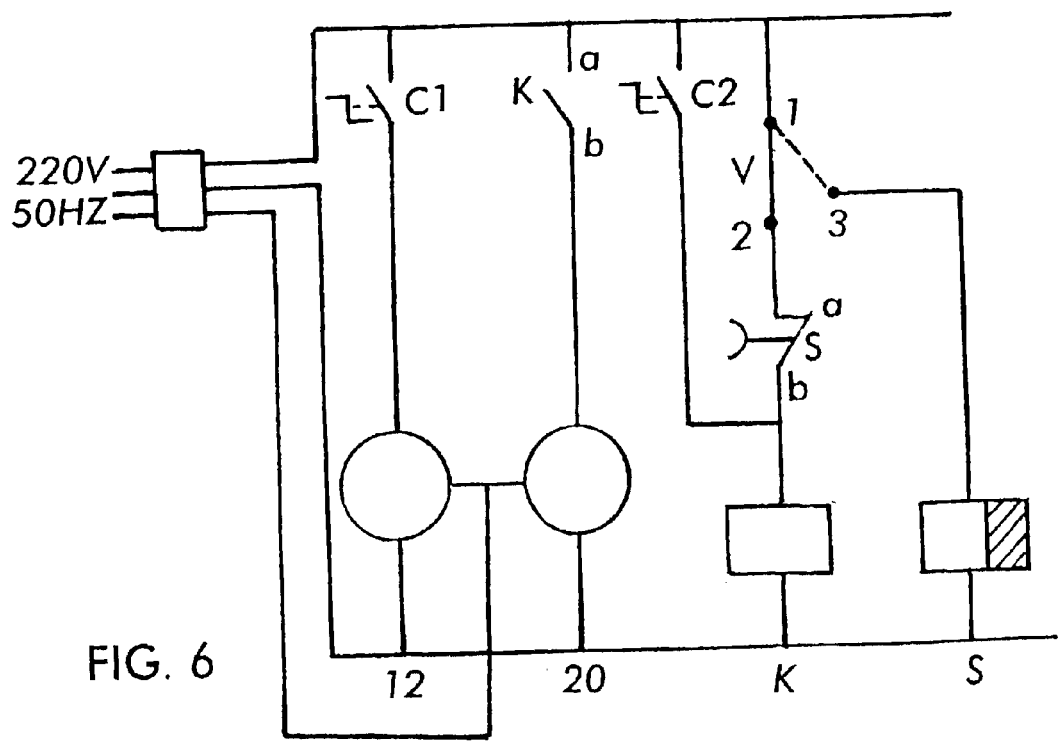
FIG. 6 is a diagram schematically showing the controlling circuit of the automatic cooker according to an embodiment of the invention.

FIG. 6 is a diagram schematically showing the controlling circuit of the automatic cooker. In the cooking process, the power is initiated and then a switch C1 is closed. As a result, the ventilator 12 rotates and the electric oven 22 starts to operate at the same time. Here, he switch C2 is closed and the power is applied to the relay K. Then, switch Kab is closed and the motor 20 of the electric pan is initiated so as to make the automatic cooker ready for cooking in a continuous state. On the other hand, the operator turns off the switch C2, then the automatic cooker shifts into the intermittent operation state in which once the operator touch the micro-active switch V, the motor stops for 10 seconds before it automatically restarts to rotate.

What is claimed is:

1. An automatic cooker, comprising a hollow cooking body with a power motor connected with the body and operable for rotating the body and the cooking body is rotatable bi-directionally and rotates either in a clockwise direction or in a counterclockwise direction.

2. The automatic cooker according to claim 1, further comprising a positioning column on the power motor, and the power motor is attached to the cooking body through the positioning column provided on the power motor to make the cooking body rotate.

3. An automatic cooker, comprising a hollow semi-spherical cooking body with a power motor connected with the body and operable for rotating the body and the cooking body is rotatable along a direction either in single direction or in bi-direction and rotates either in a clockwise direction or in a counterclockwise direction;

further comprising a positioning column on the power motor, and the power motor is attached to the cooking body through the positioning column provided on the power motor to make the cooking body rotate;

wherein the cooking body can rotate along a direction within either more than 360° or less than 360° and rotate either in a successive state or in an intermittent state.

4. The automatic cooker according to claim 3, wherein the rotation angle is along a longitudinal direction defined by a vertical central line and the rotation is in a horizontal plane that is configured to be limited between 0 degree to 90 degrees.

5. The automatic cooker according to claim 1, wherein the cooking body is provided with stirring ribs in the body.

6. An automatic cooker, comprising a hollow cooking body with a power motor connected with the body and operable for rotating the body and the cooking body is rotatable along a direction either in single direction or bidirectionally and rotates either in a clockwise direction or in a counterclockwise direction;

wherein the cooking body and a heater are arranged inside a housing which traps fumes from said cooking body;

a water filter;

a ventilator and a filtering conduit for drawing and guiding such fumes from said housing to said water filter, for trapping such fumes in water in said water filter.

7. The automatic cooker according to claim 6, further comprising:

a secondary filtering conduit and a pump for conducting said water containing such fumes and recirculating said water through said water filter for additional filtering.

8. An automatic cooker, comprising a hollow semi-spherical cooking body with a power motor connected with the body and operable for rotating the body and the cooking body is rotatable along a direction either in single direction or in bi-direction and rotates either in a clockwise direction or in a counterclockwise direction;

further comprising a ventilating fan driven by a power motor, a blade assembly of the ventilating fan is comprised of at least two sets of blades and a side of the lower portion of the blade assembly is provided with air outflow ports.

9. The automatic cooker according to claim 8, wherein the ventilating fan introduces the fume within a housing into water through the blade assembly of the ventilator fan after increasing the pressure of the fume, thereby filtering the fume out through the water; and the filtered gas and fume introduced to the housing are sucked and directed into the water again, realizing an operation cycle.

10. The automatic cooker according to claim 8, comprising a pump below the ventilator fan for pumping water into a suction conduit for introducing the water into the secondary filtering conduit, whereby the water mixes with the fume and gas; then, a water discharging port provided on the side of the secondary filtering conduit whereby water is introduced into the water tank so that the water can be utilized repeatedly and a multiple filtering process is realized.

11. An automatic cooker, comprising:
- a hollow semi-spherical cooking body with a power motor connected with the body and operable for rotating the body; and
- a ventilating fan driven by a power motor, a blade assembly of the ventilating fan is comprised of at least two sets of blades and a side of the lower portion of the blade assembly is provided with air outflow ports.

12. The automatic cooker according to claim 11, wherein the ventilating fan introduces the fume within a housing into water through the blade assembly of the ventilator fan after increasing the pressure of the fume, thereby filtering the fume out through the water; and the filtered gas and fume introduced to the housing are sucked and directed into the water again, realizing an operation cycle.

13. The automatic cooker according to claim 11, comprising a pump below the ventilator fan for pumping water into a suction conduit for introducing the water into the secondary filtering conduit, whereby the water mixes with the fume and gas; then, a water discharging port provided on the side of the secondary filtering conduit whereby water is introduced into the water tank so that the water can be utilized repeatedly and a multiple filtering process is realized.

14. An automatic cooker comprising:
- a hollow cooking body with a motor connected with the body and operable for rotating the body; and
- a ventilating fan comprising a blade assembly having blades, a portion of the blade assembly having air outflow ports.

15. The automatic cooker according to claim 14, wherein the ventilating fan introduces fumes from a housing of the cooking body into a water filter through the blade assembly of the ventilator fan after increasing the pressure of the fumes, thereby filtering the fumes through the water; and the filtered fumes are sucked and directed into the water again, realizing an operation cycle.

16. The automatic cooker according to claim 15, further comprising a pump disposed for pumping water into a suction conduit for introducing the water into a secondary filtering conduit, whereby the water mixes with the fumes, and then, a water discharging port provided on the secondary filtering conduit delivers said water into the water filter so that the water can be utilized repeatedly and a multiple filtering process is realized.

17. The automatic cooker according to claim 14, further comprising a pump disposed for pumping water into a suction conduit for introducing the water into a secondary filtering conduit, whereby the water mixes with fumes from a housing of the cooking body, and then, a water discharging port provided on the secondary filtering conduit delivers said water into the water filter so that the water can be utilized repeatedly and a multiple filtering process is realized.

18. An automatic cooker comprising:
- a hollow cooking body and a motor connected with the body and operable for rotating the body;
- a housing disposed for trapping fumes from said cooking body;
- a water filter;
- a ventilator and a filtering conduit for drawing and guiding such fumes from said housing to said water filter, for trapping such fumes in water in said water filter.

19. The automatic cooker according to claim 18, further comprising:
- a secondary filtering conduit and a pump for conducting said water containing such fumes and recirculating said water through said water filter for additional filtering.

* * * * *